United States Patent
Van Rotterdam et al.

(10) Patent No.: US 10,169,376 B2
(45) Date of Patent: *Jan. 1, 2019

(54) SYSTEM AND METHOD OF HIERARCHICAL DATA CONTAINERS

(71) Applicant: EMC Corporation, Hopkinton, MA (US)

(72) Inventors: Jeroen Van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 569 days.

This patent is subject to a terminal disclaimer.

(21) Appl. No.: 14/568,726

(22) Filed: Dec. 12, 2014

(65) Prior Publication Data

US 2015/0169649 A1   Jun. 18, 2015

Related U.S. Application Data

(63) Continuation of application No. 13/436,926, filed on Mar. 31, 2012, now Pat. No. 8,949,281.

(51) Int. Cl.
*G06F 17/30* (2006.01)

(52) U.S. Cl.
CPC .. *G06F 17/30289* (2013.01); *G06F 17/30091* (2013.01); *G06F 17/30292* (2013.01);
(Continued)

(58) Field of Classification Search
CPC ......... G06F 17/30289; G06F 17/30091; G06F 17/30292; G06F 17/30589; G06F 7/30607; G06F 17/30961
See application file for complete search history.

(56) References Cited

U.S. PATENT DOCUMENTS 6,356,920 B1 * 3/2002 Vandersluis ...... G06F 17/30389
707/E17.125
7,860,838 B2 * 12/2010 Gupta ............... G06F 9/4428
707/651

(Continued)

FOREIGN PATENT DOCUMENTS

| CN | 1860723 | 11/2006 |
|---|---|---|
| CN | 102239468 | 11/2011 |
| WO | 2011023134 A1 | 3/2011 |

OTHER PUBLICATIONS

LinuxQuestions.org, "C++ Initialized Class Member Variables of Another Class Type", published Apr. 13, 2011. (Year: 2011).*

*Primary Examiner* — Jeff A Burke
(74) *Attorney, Agent, or Firm* — Van Pelt, Yi & James LLP

(57) ABSTRACT

A method, article of manufacture, and apparatus for managing a computing environment, such as a cloud data repository. In some embodiments, such may include modifying an object or a component of an object at runtime and storing the modified object or modified component of an object in a storage device. In some embodiments, the component of an object being modified may include traits. In some embodiments, traits may be hierarchical data structures, including hierarchical data structures having more than one version. These hierarchical data structures may also contain or be associated with metadata, and may also make up the metadata of a host object. Embodiments provide that policies may be applied to these traits.

19 Claims, 9 Drawing Sheets

(52) U.S. Cl.
CPC .. *G06F 17/30589* (2013.01); *G06F 17/30607* (2013.01); *G06F 17/30961* (2013.01)

(56) References Cited

U.S. PATENT DOCUMENTS

| | | | | |
|---|---|---|---|---|
| 8,442,998 | B2* | 5/2013 | Mansfield | G06F 17/218 707/791 |
| 9,164,751 | B2* | 10/2015 | van Rotterdam | G06F 17/30309 |
| 9,189,509 | B1* | 11/2015 | Tsypliaev | G06F 17/30327 |
| 2002/0073091 | A1* | 6/2002 | Jain | G06F 9/465 |
| 2005/0249536 | A1 | 11/2005 | Sedky et al. | |
| 2009/0112879 | A1 | 4/2009 | Oliveira et al. | |
| 2013/0218933 | A1* | 8/2013 | Ismailov | G06F 9/4435 707/812 |

* cited by examiner

SYSTEM AND METHOD OF HIERARCHICAL DATA CONTAINERS

CROSS REFERENCE TO OTHER APPLICATIONS

This application is a continuation of co-pending U.S. patent application Ser. No. 13/436,926, entitled SYSTEM AND METHOD OF HIERARCHICAL DATA CONTAINERS filed Mar. 31, 2012 which is incorporated herein by reference for all purposes.

FIELD OF THE INVENTION

This invention relates generally to data systems, and more particularly to systems and methods for organizing and upgrading data in data systems.

BACKGROUND OF THE INVENTION

Traditionally, hierarchical data relationships, such as trees or directory/folder-type data structures or organizing schemes, are commonly defined or implemented in parent-child type data tables. A traditional hierarchical data relationship is depicted in FIG. 1. Hierarchical tree data relationship 1, having root node 11, and tree relationship 2 having root node 12, correspond to the hierarchical relationship data in table 3. In such tables, the hierarchical relationships 1, 2 are broken down as a collection of parent-child relationships or pointers, where the hierarchical container or tree identifier 1, 2, is indicated in column 4, and the parent (column 5) and child (column 6) relationships making up the hierarchical relationships are set out for each tree 1, 2. For example, in hierarchical container 2, with root node 12 having child node 22, the child relationships 23 of node 22 are child node 32 (the relationship being stored in row 42), and child node 33 (the relationship stored in row 43).

Such tabular implementations have some disadvantages with respect to the storage of such data structures, and particularly in the case of database storage of the hierarchical data structure. For example, if someone desires that the hierarchical data structure be reconstructed from a database stored in the form depicted in table 3, O(n) queries will be required, where n is the number of nodes in the tree. This linear reconstruction time may be associated with significant degradation in performance for commonly-encountered real-world large values n.

Additionally, this parent-child data table 3 for a hierarchical data structure leaves the data structure unsuitable for embedding in an object, because the parent-child relationships that make up the data structure 1, 2 are stored in a table 3 that is external to the head or root node 101, 102, pointer, or other identifying characteristic of a given data structure 1, 2 or instance thereof.

Versioning of data, such as a hierarchical data structure, may include the naming and cataloging of discrete or unique states of an object or data structure such as a hierarchical data structure. As a consequence of the storage aspects of hierarchical containers discussed above, including the complexity and volume of required storage, versioning of hierarchical data structures is generally inefficient. As these data structures change, it is typically necessary to maintain the entire historical data structure in order to show past versions of the data structure being examined. Thus, a great deal of storage is required to maintain historical information about these data structures.

There is a need, therefore, for an improved method, article of manufacture, and apparatus for the organization of data in data systems, including for hierarchical data structures, and for making modifications to the data stored in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
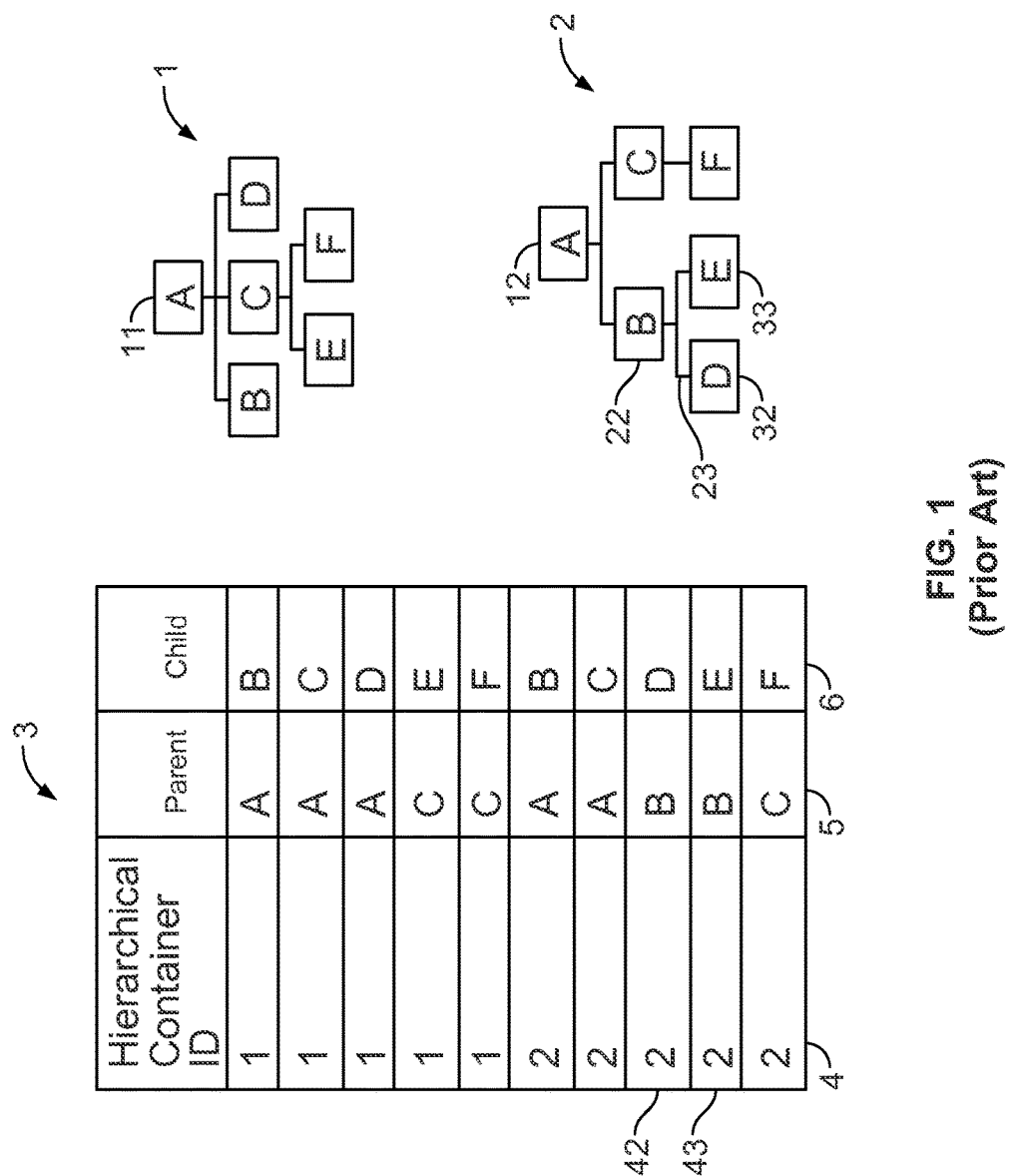
FIG. 1 illustrates a tabular representation of a hierarchical representation according to the prior art.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard-coded in hardware or in firmware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, and particularly data objects, in analog, digital, or other form. Although terms such as document, file, object, etc. may be used by way of example, the principles of the invention are not limited to any particular form of representing and storing data or other information; rather, they are equally applicable to any manner of representing and storing information. Similarly, while reference may be made herein to a database, data system, document storage system, data repository, or similar systems or data collections; reference to one type of these systems should be taken to refer to all such suitable systems unless explicitly stated otherwise.

Embodiments of the present invention describe or establish a method or apparatus in which hierarchical containers are defined. These hierarchical containers may then, in certain embodiments, be embedded in objects. Embodiments of the instant invention may be used for creating hierarchical containers that define nested containers, including nested hierarchical containers. In other embodiments, hierarchical containers may define hierarchical ordered associations.

The techniques and structures described herein allow for dynamic definitions of data objects, or subsidiary data structures or characteristics, as described in greater detail in co-owned and co-pending U.S. patent application Ser. No. 13/174,746, for DYNAMIC DATA STRUCTURES, filed Jun. 30, 2011; such application is incorporated herein by reference for all purposes.

As described in such application, a data object may be implemented in the form of an XML document. For example, a "document" data object may be created, in some embodiments relating to a scanned paper document, a data file, or some other actual, virtual, or electronic document or file. This object of type "document" may be given traits, for example by the appropriate provision of tags in the XML document. In some embodiments, rather than "traits," data aspects, or other cross-cutting or multi-object data structures or attributes may be associated with a data object (referred to collectively herein as "traits"), for example by implementation in an XML document. These data objects, with their associated traits, may be conveniently stored in an object-oriented or other database, for example one optimized for storage of XML documents if the objects or traits are implemented in such documents. The xDB databases distributed by the assignee of the instant invention may suitably be employed in an embodiment for the storage of XML documents implementing data objects and associated traits.

The enhanced techniques described herein allow for dynamic definitions of data objects, or data structures including hierarchical data structures. A trait definition defines the data model, but a trait may also expose services and methods. Adding traits to objects during runtime allows for a flexible database model without the need to define a rigid database structure upfront.

Objects and traits according to embodiments of the present invention may each have a type. Object types may be defined in an XML document, and object type definitions may include a name, a namespace, and a version, for example, and in embodiments of the present invention may be stored in the type system database, for example in an xDB database. Trait definitions may similarly be stored in a or the type system database.

As another example of a trait according to an embodiment of the invention, an object of type "document" may be created with a "content" trait and an "authoring" trait. The object holds data related to some file, an instance of the "document" object, that may be stored elsewhere in the system, for example in native, binary large object ("BLOB"), well-known binary data format, or MIME format. In some embodiments, the "content" trait may group data concerning that file (MIME type, size, file reference, file name, or file system metadata, for example), while the "authoring" trait may be associated with data concerning the authoring process of the file (last modified date, last modifier, creation date, creator, or application metadata, for example).

Traits are data definitions well-adapted to be added at runtime, to a data structure such as an object. A trait definition defines the data model, but a trait may also expose, provide, or enable services and methods. Adding traits to objects during runtime allows for a flexible database model without the need to define a rigid database structure upfront. Embodiments may further allow for the addition, or modification, of traits on-the-fly without interrupting the continuous use the storage system or database. A trait is a part of an object with an associated trait definition defining the restrictions for that part of the object. A composite object can hold multiple traits each with an associated trait definition.

Figure 2:
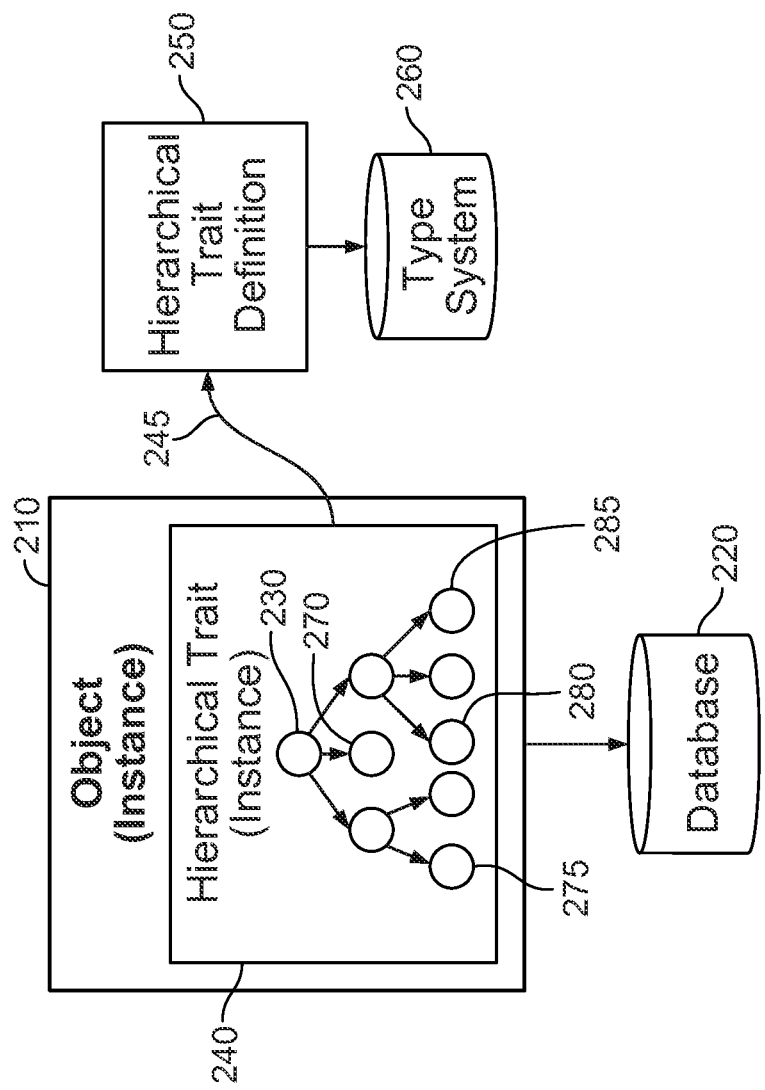
FIG. 2 illustrates a data system in accordance with some embodiments.

FIG. 2 illustrates a data system in accordance with certain embodiments of the invention. An instance 210 of an object is instantiated and stored in a database 220. In the depicted embodiment, the hierarchical relationship depending from root node 230 may be held in a hierarchical container 240, which may be instantiated as, and can also be identified as, embedded trait 240 of object instance 210. Embedding the hierarchical container 240 at the object 210 level eliminates the need for an external data structure 3, and allows the hierarchical container 240 to be treated as a trait 240 of a composite data object 210. Traits are data definitions applicable to a data structure, such as an object. The hierarchical container 240, being a trait, is associated via pointer reference 245 with trait definition 250 stored or contained in type system database 260. The trait definition defines the schema for the trait, which is in turn a piece of the metadata of the object. The trait definition may also defines services that are specific to this piece of the metadata, and/or may define an event model such as an event handler for the particular trait it defines.

The object may contain or host other traits, not depicted. For example, an object may be a "document" object with a "content" trait and an "authoring" trait, not depicted. The object holds data related to some file that may be stored elsewhere in the system. The "content" trait may group, for example, data concerning that file (MIME type, size, file reference, file name), while the "authoring" trait may group data concerning the authoring process of the file (last modified date, last modifier, creation date, creator).

As a hierarchical data structure, root node 230 may have depending or descendant nodes of varying depths such as 270, 275, 280, 285, and other descendant nodes not specifically enumerated here.

Figure 3:
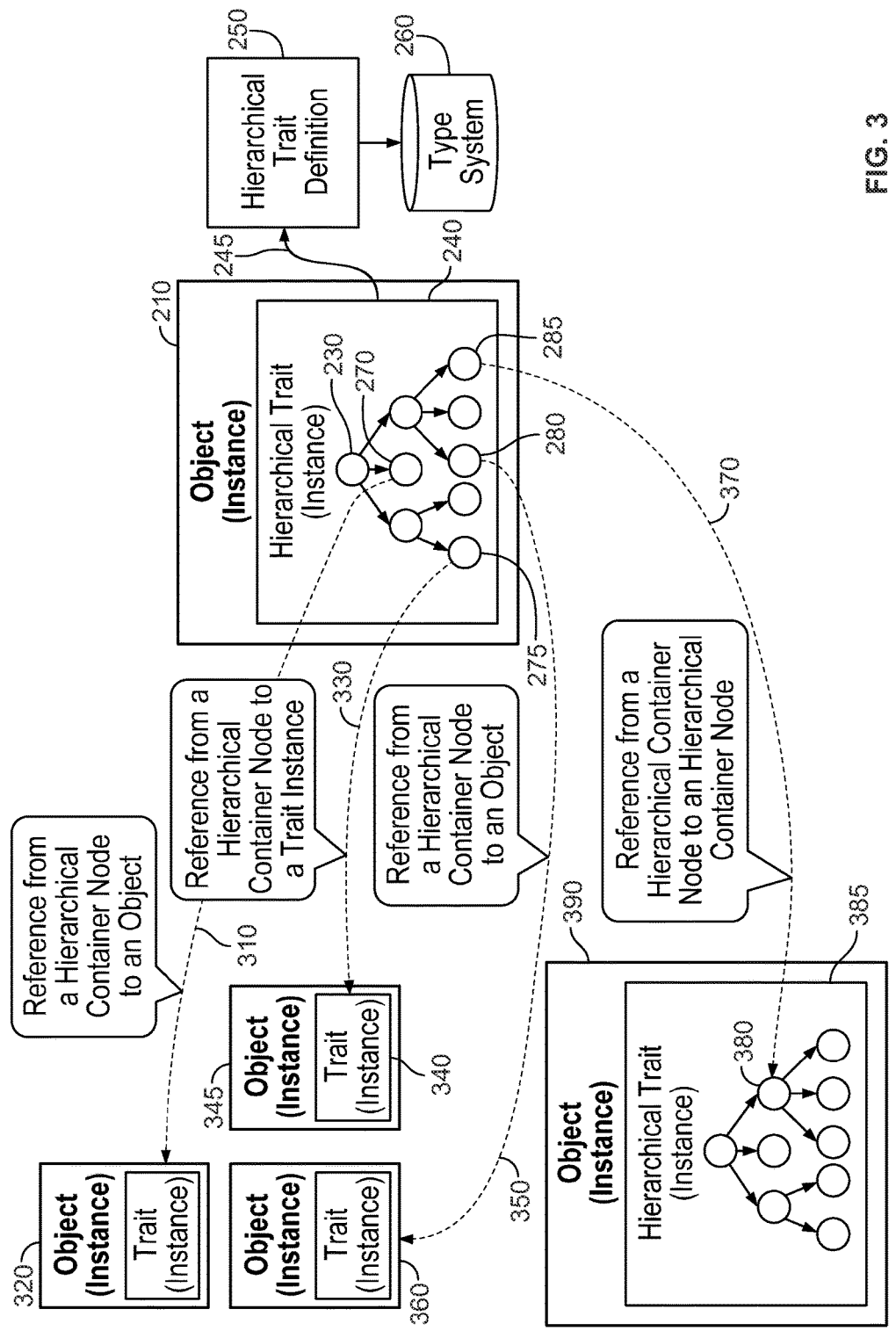
FIG. 3 illustrates a data system in accordance with some embodiments including associations external to a data structure.

According to certain embodiments of the present invention, hierarchical containers can be used for associating other objects, objects' traits, and/or other hierarchical container nodes. FIG. 3 illustrates a data system in accordance with certain embodiments of the invention, including embodiments in which objects are associated with or from the hierarchical container. As in FIG. 2, object instance 210 contains an embedded hierarchical container trait 240, with associated trait definition 250 stored in type system 260. Elements of the hierarchical data structure 230 may be associated with other objects or data elements. For example, hierarchical container node 270 may be associated with instance 320 by pointer 310 or other addressable or any other lookup or reference (referred to generally as "pointers" herein). A further descended hierarchical container node 280 may be associated with a different object instance 360. Similarly, trait instance 340, embedded in object instance 345, may be associated with hierarchical container node 275 by pointer 330. Embodiments also provide for the association of a hierarchical container node 285 with a node 380 of a separate instance of a hierarchical container trait 385 in separate object instance 390.

Figure 4:
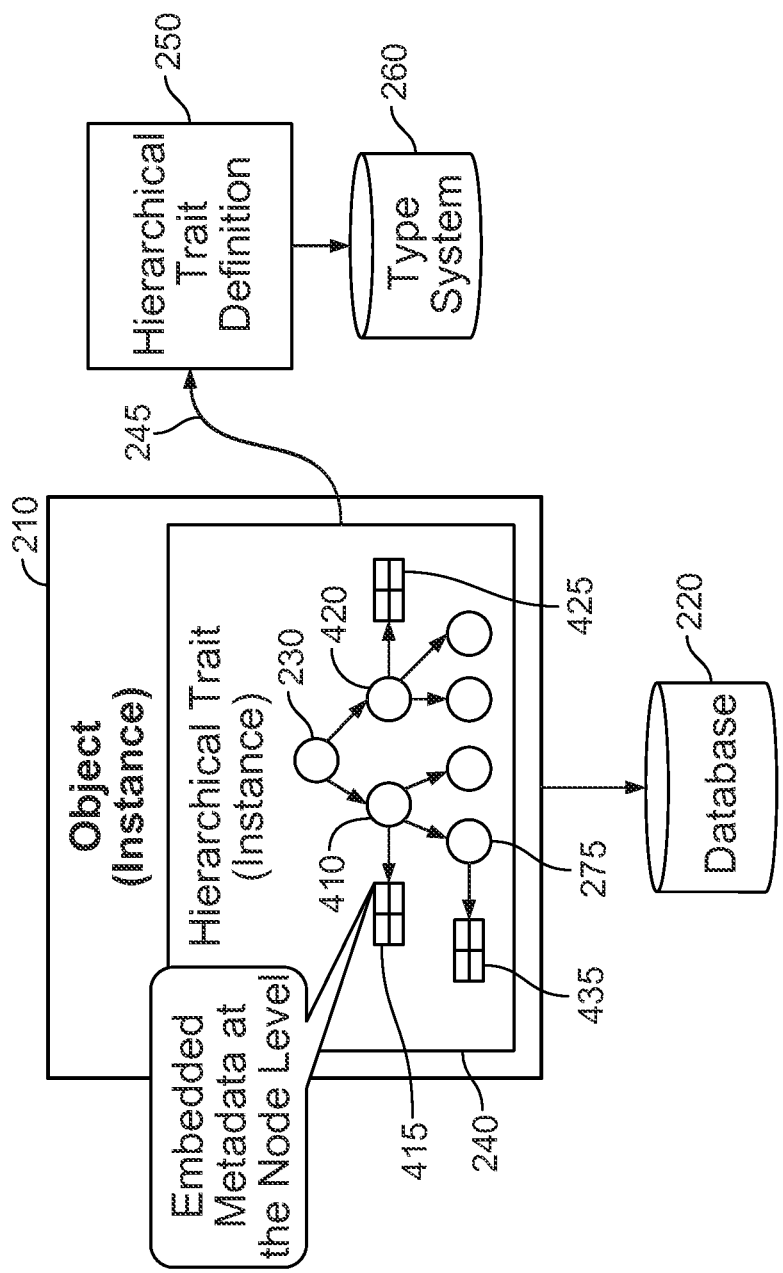
FIG. 4 illustrates a data system having embedded metadata in accordance with some embodiments.

Embodiments of the present invention may also provide for the storage of metadata within the hierarchical container and/or at a hierarchical container node. FIG. 4 illustrates a data system in accordance with some embodiments of the invention. Object instance 210 contains an embedded hierarchical container trait 240, with associated trait definition 250 stored in type system 260. Hierarchical container node 410 is associated via pointer with metadata 415. In this manner, metadata may be embedded within a hierarchical container trait, at the node 410 level. Similarly, metadata 425 may be associated with hierarchical container node 420, and further down the hierarchical container, metadata 435 may be associated with hierarchical container node 275.

Such embodiments provide for hierarchical container nodes such as node 275, 410, and 420 that may contain metadata (such as 435, 415, and 425, respectively) that is strongly typed. The associated 245 hierarchical trait definition 250 may be used in order to define or restrict which metadata 415, 425, 435 supports embedding within or at the container node 275, 410, or 420.

In certain embodiments the hierarchical container may be embedded at the object level and serialized in XML, accessed via a representational state transfer (REST) interface and URI. Certain embodiments of the invention may provide for the storage of metadata at any node in a hierarchical container. Hierarchical containers according to the invention may also have associated policies. In addition, or in lieu of such associated policies, in certain embodiments the policies may be associated with objects referred from or by a hierarchical container.

Embodiments of the instant invention may have other associations with a hierarchical container or certain nodes in one or more hierarchical containers. For example, certain information system behavior or data treatment may be associated with a certain node or type of node in a hierarchical container or type of hierarchical container. Another type of association with a node or type of node may be event-handling processes (including processes effected by codes, scripts, subroutines, or other machine instructions including encoded in hardware or firmware).

Other embodiments of the invention provide for versioning of hierarchical containers, i.e., the tracking and/or cataloging of different related instances or a chain of related instances of a hierarchical container. In certain embodiments, such versioning may include or offer optionally the tracking or storage of incremental changes in an instance or type of hierarchical container that can be reviewed indefinitely or for some period in the future thereby providing for the understanding of changes in data structures over time or the use or manipulation of legacy or warehoused data.

Other embodiments may provide for hierarchical containers which are customized from a certain archetype or original genus hierarchical container structure to provide for the maximum utility to a certain business or other data user or group. Some of these embodiments may be considered as providing "personalized" or "customized" hierarchical containers. Embodiments of the invention may also provide for inheritance or polymorphism of a certain hierarchical container with respect to a previously-existing hierarchical container.

A hierarchical container according to certain embodiments of the invention is a data structure that may be embedded in an object. A hierarchical container of the present invention may also have embodiments in which the hierarchical container contains a deeply-nested data structure. Sub-embodiments of these may include hierarchical containers that are linked to or refer to by pointer other hierarchical containers in the same or other objects.

One embodiment of the invention provides for a hierarchical container which may be embedded at the object level. In specific embodiments of this type, the hierarchical container will further be serialized in XML. It may be appreciated that embedding the hierarchical container at the object level eliminates the need for an external data structure in order to embody or implement the hierarchical container. Such an embodiment which provides for a hierarchical container to be embedded further allows the hierarchical container to be treated or established as a trait of a composite data object. Embodiments provide that an object's trait may typically be associated with a trait definition that defines the trait, and accordingly may impose restrictions on, or may enhance, the behaviors and properties of the trait part of the object. The trait, then, makes up metadata associated with an object. A composite object can hold or host multiple traits each with an associated trait definition. Embodiments of the invention may enable or utilize traits that describe the object, such as a version or versioning trait. If the object holds a particular trait, particular properties or behaviors may be associated with such trait; for example, an object that holds or contains a versioning trait, may support or implement versioning. A versioning trait would typically in many embodiments contain some properties and services that manage versioning capabilities. For example, "last modified date" could be an aspect of the schema provided by such trait.

Figure 5:
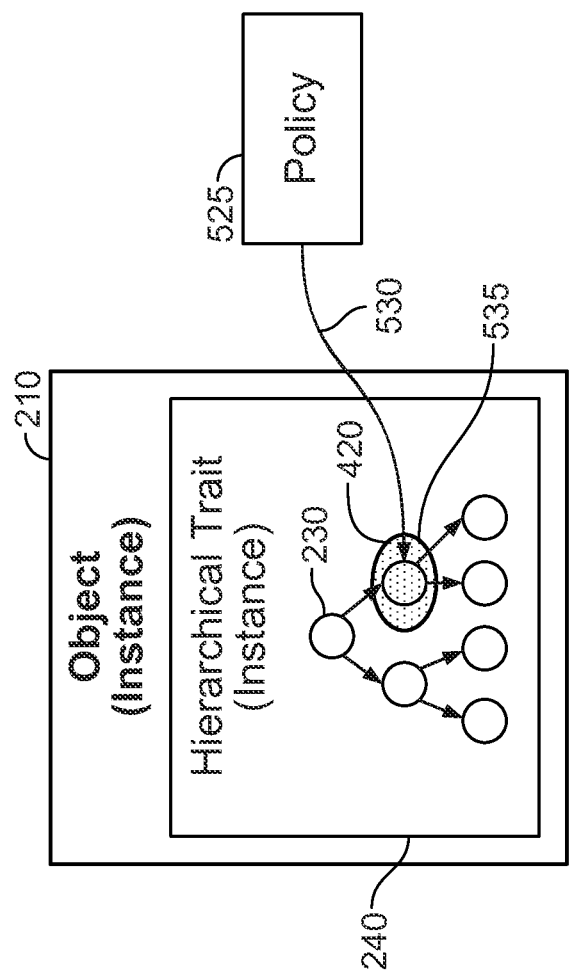
FIG. 5 illustrates a data system having policies associated with a data structure in accordance with some embodiments.

Embodiments of the present invention also provide for the establishment of external policies that may be associated with a hierarchical container node. Policies referring to an hierarchical container node can apply or expose particular behavior to that container node and/or its decedents; and/or the policy may apply/expose particular behavior to all objects that are referred to by the that particular hierarchical container node. FIG. 5 illustrates a data system in accordance with some related embodiments of the invention. As with other embodiments depicted herein, object instance 210 contains an embedded hierarchical container trait 240. Associated trait definition 250 stored in type system 260 is not depicted in FIG. 5. Policy 525 may be applied or associated with hierarchical container node 420 via pointer 530. The hierarchical container nodes impacted by or subject to the policy are bounded by policy application area 535. Policy application area 535 indicates that for the hierarchical container having root node 230, the policy has application to hierarchical container node 420 to which the policy 525 is applied, in this embodiment and state.

Figure 6:
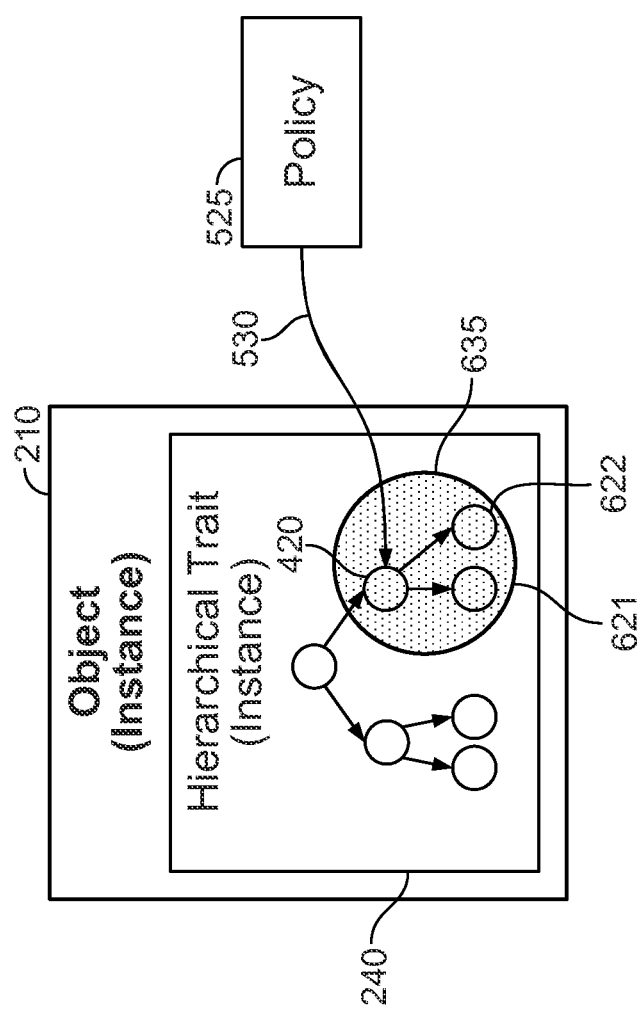
FIG. 6 illustrates a data system having associated policies in accordance with some embodiments.

FIG. 6 illustrates a data system in accordance with some embodiments of the invention, and in particular depicts the application of a policy 525 to a node 420 of hierarchical container trait 240 associated with object instance 210. Policy 525 in this embodiment and state may be designed or applied so as to have application or to restrict the hierarchical container node 420 with which policy 525 is associated via pointer 530, and to have application as well to the child or descendant leaf nodes 621, 622 of node 420. Embodiments provide for the selection of policy applicability to children or other descendants at a certain specified depth/level or levels (e.g. in which child nodes 621, 622) or the entire subtree rooted by node 420. Several of such policy application instructions (e.g. entire subtree from node 420; node 420+ children of node 420; node 420 and descendants to a depth of (n+1)) may result in the depicted policy application area 635 of FIG. 6. Certain such policy applicabilities (e.g. entire subtree) may be selected by the user or administrator as the default policy applicability in the absence of a contrary selection, or the system may provide for no options at all in policy applicability.

Figure 7:
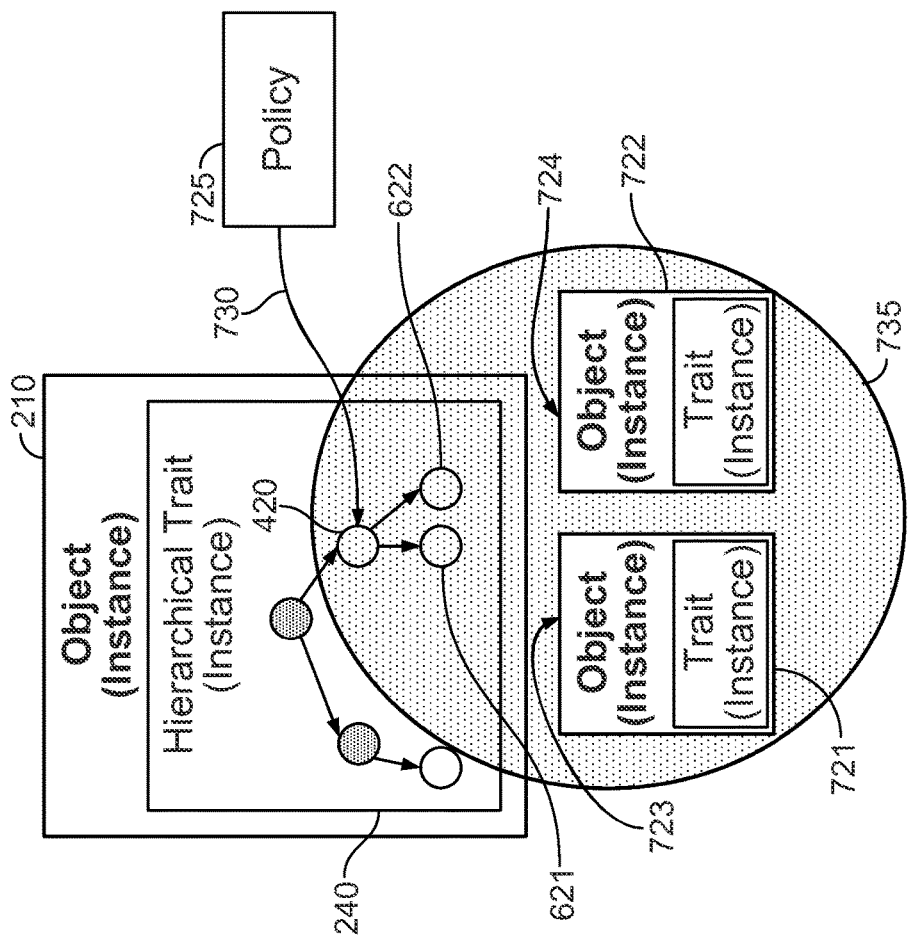
FIG. 7 illustrates a data system having associated policies in accordance with some embodiments.

FIG. 7 illustrates a data system in accordance with some embodiments of the invention, and in particular depicts the application of a policy 725 to a node 420. Policy 725, in this embodiment and state, may be designed or applied to have application to, or restrict the hierarchical container node 420 with which policy 725 is associated via pointer 730, and to have application as well to child nodes 621 and 622, and also to have application to associated or linked object instances 721 and 722, associated with nodes 621 and 622 respectively by pointers 723 and 724, respectively. The applicability of policy 725 to node 420, in this embodiment and state, may be set, for example, to apply to the entire subtree for which node 420 is the root, and any object instantiations (e.g. 721 and 722) linked to any node subject to the policy 725. Such an applicability policy may be expected to result in policy application area 735. As before, such policy applicabilities (e.g. entire subtree, including linked objects) may be selected by the user or administrator as the default policy applicability in the absence of a contrary selection, or the system may provide for no options at all in policy applicability.

Policies according to embodiments of the invention may pertain to any computer processing, storage, administrative, security, backup, archiving, or other function that may be applied or executed according to defined or determinable standards, criteria, or rules. Another example of a policy according to some embodiments are security policies, a special case of a policy that can refer to a hierarchical container node.

Another policy that may be applied as a policy and associated with a hierarchical container trait or node in some definition for the hierarchical container can define event handlers (event handling processes, instructions, or routines, to define additional behavior before or after an event occurs related to the container node. The additional behavior may, in some embodiments, be defined in a script or using application logic. Embodiments provide for event handlers that can be defined in the trait definition which may include events such as "On Access Node," under which a behavior is initiated before or after a container node is accessed; "On Append Node," the event relative to which a behavior is initiated being the appending of a data structure (e.g. an object, node, or other container node) to the container node subject to the policy; "On Delete Node," the event of a container node being deleted; "On Change Node," the event of a container node being changed; "On Metadata Access," the event of container node's metadata being accessed; "On Metadata Add," the event of metadata being added to the container node; "On Metadata Delete," a container node's metadata is deleted; "Metadata Change," a change in the container node's metadata event.

Figure 8:
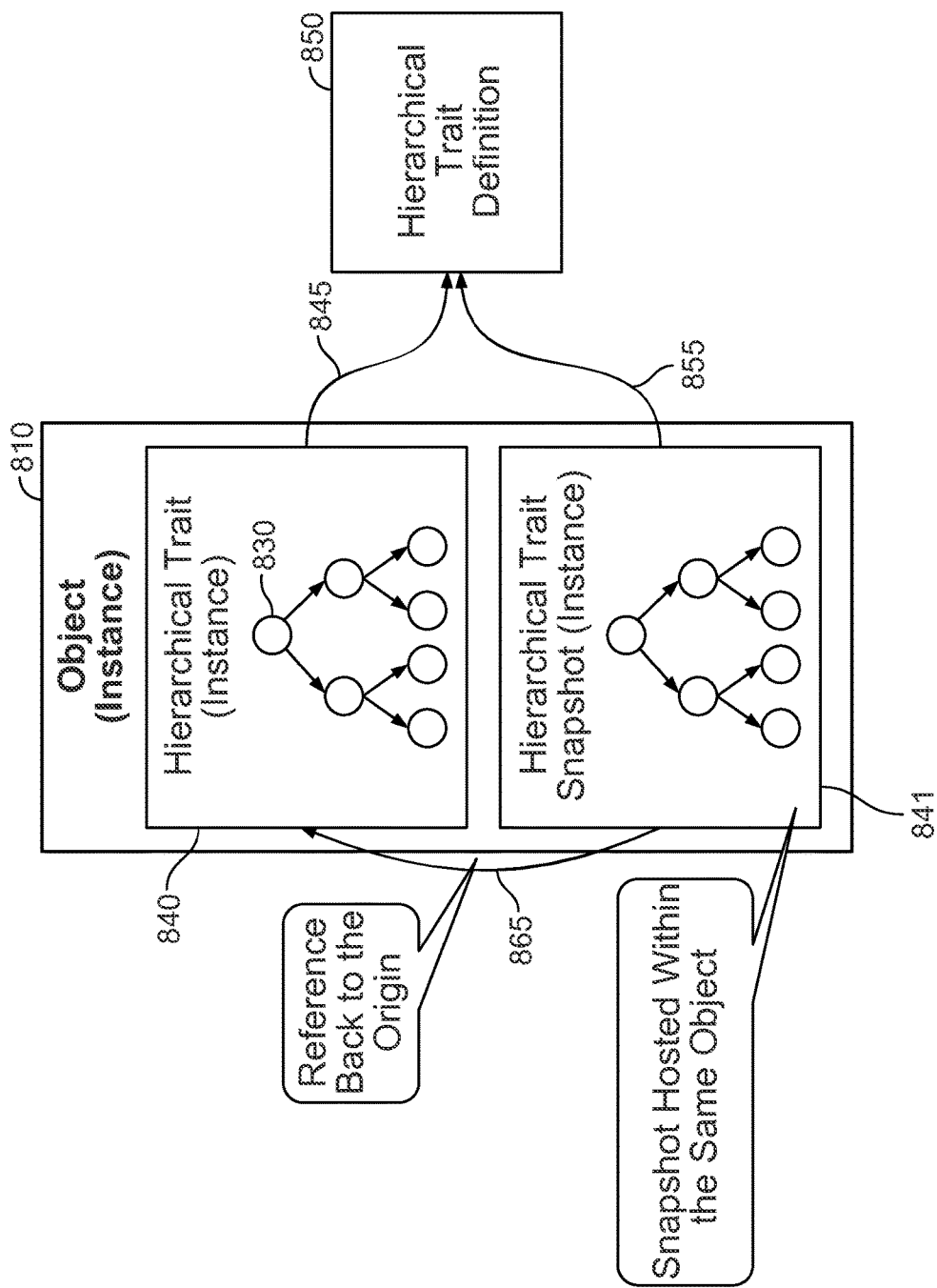
FIG. 8 illustrates a data system having a data structure with an associated snapshot in accordance with some embodiments.

Since hierarchical containers are associated with an object in composite data structures, they can be versioned as like any other object-versioning model, and versioning information can be created and/or stored in conjunction with any event-driven or any other change to a hierarchical container. Similarly, the state of a hierarchical container can be preserved by creating a snapshot of that state. As used herein, a "snapshot" is a copy of the hierarchical trait container. FIG. 8 illustrates a data system having a data structure with an associated snapshot in accordance with some embodiments. Object instantiation 810 is host to a hierarchical trait 840 containing hierarchical container having root node 830. Snapshot 841 of this trait is hosted by the same object 810 as an additional instance of the trait. Both instances of the trait, the original trait 840 and the snapshot trait 841, may be associated with the same hierarchical trait definition 850 by pointers 845 and 855, respectively. In other embodiments, each trait 840 and 841 may be associated with separate but identical hierarchical trait definitions 850. Embodiments will provide for a pointer association 865 from the snapshot trait 841 back to the original trait 840.

Figure 9:
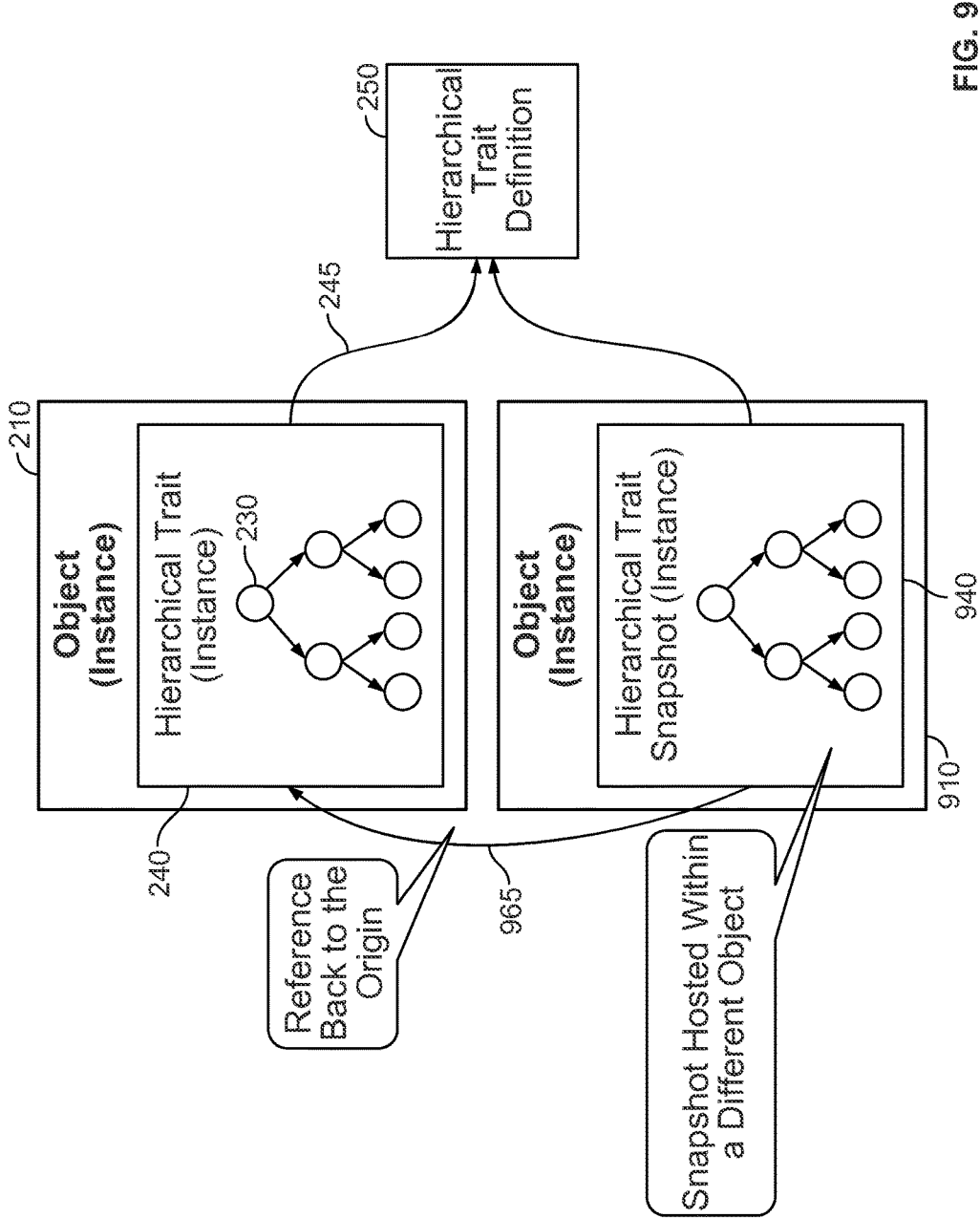
FIG. 9 illustrates a data system having a data structure with an external associated snapshot in accordance with some embodiments.

This copy of the container or trait 841 can be bound to the same object 810 as the original trait 840, or it can alternately or also be bound to one or more different host objects. FIG. 9 illustrates a data system having a data structure with an external associated snapshot in accordance with some embodiments. As in FIG. 2, object 210 has an embedded trait 240, which trait is associated by pointer 245 with hierarchical trait definition 250. Snapshot 940, the copy of hierarchical container 240, is hosted by independent object 910. Snapshot 940 is also associated via pointer 965 to original hierarchical container trait 240. Some embodiments provide that during a snapshot operation, node identity within the hierarchical container is not necessarily preserved. Instead, a node within a snapshot hierarchical container node may simply refer back to its origin, that is, contain a pointer to the node of the hierarchical container from which the copy is made.

Embodiments of the invention provide that hierarchical containers may be "personalized" or customized to meet the needs of the data systems users or administrators. In this way, hierarchical containers can be used to manage personal folder or directory structures (e.g., folder structures custom or idiosyncratic to a user) where each user can have one or more objects hosting one or more hierarchical container traits.

Embodiments of the invention provide that hierarchical containers can be used to efficiently management "virtual documents," i.e., data elements such as data objects or a similar user-display construct where an apparent document is assembled based on references or data elements associated with pointers. The hierarchical container can host all the references to associated parts of the entire "virtual document." The parts of this virtual document can be assembled and displayed to a user by following all references from each hierarchical container node and combining them for display to the user in a single document interface, analog, or experience.

For the sake of clarity, the processes and methods herein have been illustrated with a specific flow, but it should be understood that other sequences may be possible and that some may be performed in parallel, without departing from the spirit of the invention. Additionally, steps may be subdivided or combined, or processes may invoke other processes to handle certain tasks. References herein to "services," "processes," "methods," "tasks," and similar terms should be understood as encompassing services, methods, applications, applets, functions, modules, daemons, scripts, tasks, and other computer processes, however denominated. While some processes or methods may be described as "expecting," "desiring," or "accepting" certain information or results, or more generally performing an action (e.g. "obtaining"), it will be appreciated by those skilled in the art that that these processes need not be sentient or have consciousness or agency, rather, anthropomorphic language indicating expectations or wishes is intended only to illustrate that the process or method may be designed to process or use certain types of arguments, or data having certain qualities or types, and that other arguments or data may result in error, failure, exception, overflow, abnormal termination, abend, or "crash;" or otherwise unexpected, inaccurate, undesirable, or suboptimal results or output. As disclosed herein, software written in accordance with the present invention may be stored in some form of computer-readable medium, such as memory or CD-ROM/optical media, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers, processors, or partitions such that, as a whole, they perform the functions of the components identified herein; i.e. they take the place of a single computer. Various functions described above may be performed by a single process or groups of processes, on a single computer or distributed over several computers. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method comprising:
creating, based at least in part on a data object type definition, an instance of a data object, wherein the data object is associated with a plurality of traits;
creating corresponding hierarchical containers for the plurality of traits, wherein a corresponding hierarchical container of the corresponding hierarchical containers includes data comprising an instance of a hierarchical relationship that is defined at least in part by a hierarchical data trait definition, wherein the hierarchical relationship comprises one or more nodes and a first node of the one or more nodes comprising the instance of the hierarchical relationship includes a reference to a data structure external to the first node; and
embedding the corresponding hierarchical containers in the instance of the data object, wherein the embedded hierarchical containers are stored with a reference to corresponding hierarchical data trait definitions, wherein the corresponding hierarchical data trait definitions are stored external to the data object.

2. The method as recited in claim 1, wherein the corresponding hierarchical container is stored in a serialized form.

3. The method as recited in claim 2, wherein the corresponding hierarchical container is stored as an XML data element.

4. The method as recited in claim 1, further comprising storing the instance of the data object in a database.

5. The method as recited in claim 1, wherein the data structure external to the first node stores metadata information.

6. The method as recited in claim 1, wherein the data structure external to the first node is external to the instance of the data object.

7. The method as recited in claim 6, wherein the data structure external to the instance of the data object comprises another instance of the same data object or an instance of a different data object.

8. The method as recited in claim 1, wherein the data structure external to the first node is another hierarchical container that includes data comprising another instance of the hierarchical relationship defined by the same hierarchical data trait definition or an instance of a hierarchical relationship defined by a different hierarchical data trait definition.

9. The method as recited in claim 1, further comprising the steps of:
creating a policy applicable to at least the first node comprising the instance of the hierarchical relationship; and
applying the policy to the first node, including by associating the policy with the first node comprising the instance of the hierarchical relationship included in the hierarchical container.

10. The method as recited in claim 9, further comprising the step of applying the policy to a second node that is associated with the first node in the instance of the hierarchical relationship.

11. The method as recited in claim 9, wherein the policy applicable to the first node comprising the instance of the hierarchical relationship is an event-handling instruction.

12. The method as recited in claim 1, wherein a hierarchical container of the corresponding hierarchical containers is associated with a data structure that is external to the hierarchical container.

13. The method as recited in claim 12, wherein the external data structure comprises a snapshot of the hierarchical container.

14. The method as recited in claim 13, wherein the snapshot of the hierarchical container is hosted by the instance of the data object.

15. The method as recited in claim 13, wherein the snapshot of the hierarchical container is hosted by another instance of the same data object or an instance of a different data object.

16. The method as recited in claim 1, wherein the instance of the data object may be reconstructed at least in part by using the data included in the corresponding hierarchical container and by following the reference to the hierarchical data trait definition.

17. The method of claim 1, wherein the data structure external to the data object includes an embedded trait.

18. A system for storing a hierarchical data structure, comprising:
a processor configured to
create, based at least in part on a data object type definition, an instance of a data object, wherein the data object is associated with a plurality of traits;
create corresponding hierarchical containers for the plurality of traits, wherein a corresponding hierarchical container of the corresponding hierarchical containers includes data comprising an instance of a hierarchical relationship that is defined at least in part by a hierarchical data trait definition, wherein the hierarchical relationship comprises one or more nodes and a first node of the one or more nodes comprising the instance of the hierarchical relationship includes a reference to a data structure external to the first node; and embed the corresponding hierarchical containers in the instance of the data object, wherein the embedded hierarchical containers are stored with a reference to corresponding hierarchical data trait definitions, wherein the corresponding hierarchical data trait definitions are stored external to the data object.

19. A computer program product, the computer program product being embodied in a non-transitory computer readable storage medium and comprising computer instructions for:

creating, based at least in part on a data object type definition, an instance of a data object, wherein the data object is associated with a plurality of traits;

creating corresponding hierarchical containers for the plurality of traits, wherein a corresponding hierarchical container of the corresponding hierarchical containers includes data comprising an instance of a hierarchical relationship that is defined at least in part by a hierarchical data trait definition, wherein the hierarchical relationship comprises one or more nodes and a first node of the one or more nodes comprising the instance of the hierarchical relationship includes a reference to a data structure external to the first node; and embedding the corresponding hierarchical containers in the instance of the data object, wherein the embedded hierarchical containers are stored with a reference to corresponding hierarchical data trait definitions, wherein the corresponding hierarchical data trait definitions are stored external to the data object.

* * * * *